Feb. 10, 1970     A. W. HAYDON     3,495,111
SMALL PERMANENT MAGNET ROTOR SHADED POLE MOTOR
Filed Dec. 4, 1967     2 Sheets-Sheet 1
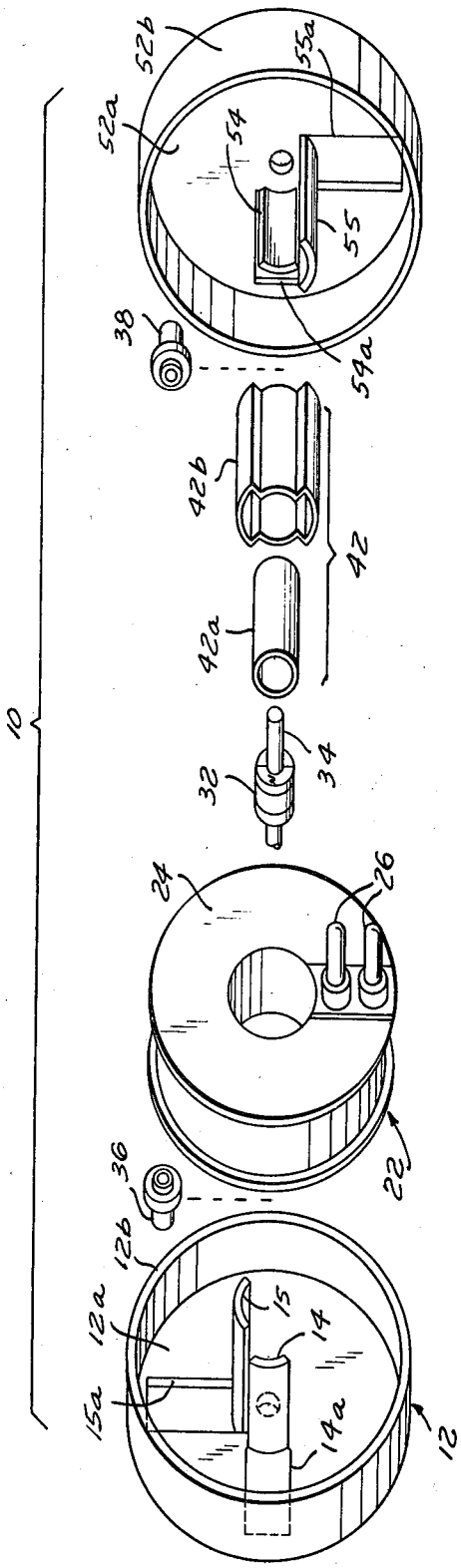
FIG. 1
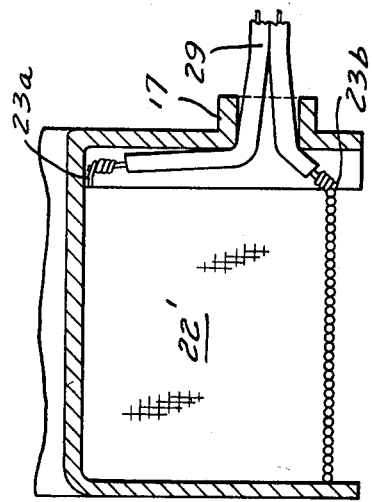
FIG. 5
FIG. 10
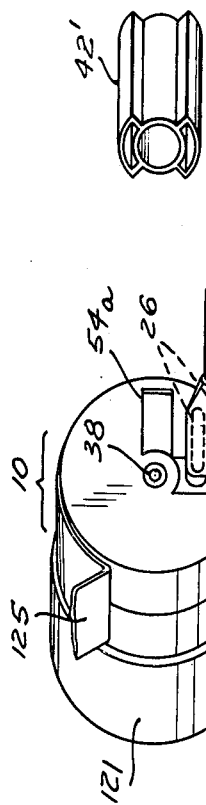
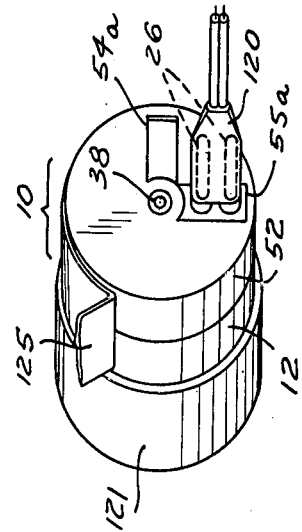
FIG. 4

Feb. 10, 1970  A. W. HAYDON  3,495,111
SMALL PERMANENT MAGNET ROTOR SHADED POLE MOTOR
Filed Dec. 4, 1967  2 Sheets-Sheet 2

United States Patent Office 3,495,111
Patented Feb. 10, 1970

3,495,111
SMALL PERMANENT MAGNET ROTOR SHADED POLE MOTOR
Arthur W. Haydon, Breakneck Hill, Conn., assignor, by mesne assignments, to Tri-Tech, Inc., Waterbury, Conn., a corporation of Connecticut
Filed Dec. 4, 1967, Ser. No. 687,843
Int. Cl. H02k 21/16
U.S. Cl. 310—156                                17 Claims

ABSTRACT OF THE DISCLOSURE

A self-starting small electric motor having a slim, cylindrical, ceramic permanent magnet rotor, a stator structure with toroidal field coil, and a crimped nonmagnetic conductive flux shading member disposed around the rotor interleaved with claw-tooth stator poles (may be of different lengths) lanced from the stator end discs providing a rotor dust cover, preventing rotary movement of the stator members, and holding the latter together. Coil terminal connections may be brought out through the openings left in the stator end discs. The field coil may be wound on a nylon bobbin and impregnated with oil to provide bearing lubrication through bobbin seepage holes and felt wafers. Alternatively, the wound coil may be diped in epoxy resin and thus be self-supporting.

BACKGROUND OF THE INVENTION

This invention pertains to small electrical motors having high torque and reliable self-starting characteristics which are useful for various modes of operation; for example, as A.C. synchronous motors, as pulsed stepping motors, and as brushless D.C. motors. The motor embodiments disclosed herein are similar in general configuration and operating principles to those disclosed in applicant's copending application, Serial No. 617,529, filed Feb. 21, 1967; however, the present design possesses certain important constructional and economical advantages over the motors described in the earlier application.

In the aforesaid copending application several compact motor embodiments are disclosed which as a group are of short cylindrical form and comprised of the following major elements: a stator assembly including several (at least four for a typical four-pole motor) interfitting disc-like parts of ferro-magnetic material, with each stator disc being lanced to provide a projecting pole so that, when the stator parts are assembled, the poles are arranged in an annular ring about the axis of a central orifice common to all of the stator discs; a doughnut-shaped field coil and bobbin surrounding the annulus formed by the stator poles; a cylindrical, non-salient pole rotor of magnetized material mounted on bearings in the motor housing for rotation inside said central orifice; and shading means in the form of a pair of conductive non-magnetic disc members, typically of copper material, associated with a diametrical pair of said stator poles to provide the requisite shading flux action for self-starting of the motor. Thus in a completed four-pole motor of the type disclosed in the prior application, the assembly of the stator poles and associated shading means requires six separate elements which must be fitted together in a prescribed manner and in proper sequence, with each part being secured in an interlocked fashion so as to maintain the respective stator poles in a predetermined orientation and spacing with respect to its neighbors. As a necessary consequence of the relatively large number and differing forms of the various parts in applicant's prior motors, the cost of their construction and assembly on a volume basis is relatively expensive. Also, because of the space required inside the cylindrical motor housing for the six or so elements forming the stator pole and shading flux members, the volumetric area available for the wire turns of the stator field coil was necessarily limited, compelling the use in the earlier design of relatively expensive, small-diameter wire in order to obtain the necessary amount of ampere-turns for satisfactory operation of these motors.

The present invention is directed to an improved motor of the general configuration and operating characteristics of applicant's earlier designs, but having a housing and stator assembly with associated shading means formed of a minimum number of parts, namely, three in number, regardless of the number of stator poles in the motor. In addition, two of the three parts, forming the motor housing and stator poles, are virtually identical and may be fabricated from the same die. Furthermore, the remaining part, which produces the shading flux required for self-starting, also acts as a rotor dust cover and serves to hold the three parts of the stator assembly together and rigidly restrained against axial rotation so that the proper spacing relationship is maintained between the stator poles. Because of the reduced number of parts in the stator assembly greater coil space is obtained.

The new design greatly simplifies and reduces the cost of construction and assembly of the motor. In addition certain other novel and important structural improvements, which will hereinafter be described, are incorporated in the new motor design.

Summary of the invention

The motor design of the present invention permits a motor housing and stator assembly with associated shading means to be fabricated from a fewer number of parts since, for a four-pole arrangement, a single peripherally-flanged disc-shaped stator member (instead of the two separate elements used in the previous embodiments) is lanced out to form a pair of adjacent stator poles, one destined to be shaded and the other unshaded. Two of these stator disc members, when assembled together in a facing arrangement, form a short cylindrical motor housing having an interior ring of stator poles arranged about a central orifice in the assembly. The faces of the four stator poles forming the annulus exemplary occupy about 75° of arc respectively, and are spaced apart from each other by a 15° angle.

A cylindrical permanent-magnet rotor is positioned on the center axis inside the stator pole annulus and its shaft is rotatably mounted on a pair of opposing end bearings fitted in the sides of the discs forming the motor housing. A doughnut-shaped stator field coil is fitted over the outside of the stator pole annulus and is provided with a radially-mounted terminal for connection either to an electrical plug or directly to external conductor leads which pass through one of the four radial slots in the side walls of the motor housing created in the formation of the stator pole annulus.

A principal component of the new motor structure is a tubular member of copper or similar non-magnetic material having one portion in the form of an annular sleeve located in the rotor-stator air gap, which together with the motor end bearings forms a dust cover for the rotor, and the other portion being configured into different-sized arcuate sections fitting in interweaved fashion over, between and under the respective poles of the four pole stator annulus. This tubular arrangement produces a delayed stator flux build-up in a diametrical pair of four stator poles which thus generates a transient rotating component in the magnetic flux field so as to cause motor starting in the well-known manner. The tubular member, which may be either a single unitary part or formed as an assembly of two parts, also serves to lock the two stator discs together and prevent relative rotary movement between their respective poles.

An additional constructional feature of the present motor is that the stator field coil acts as a reservoir carrying a supply of lubricant which is fed by capillary channels to the motor end bearings. Another important design feature is that, due to the saving in the number and size of the parts forming the stator and shading flux members of the motor, greater room is available for the field coil windings, thus permitting the use of less expensive, larger-diameter wire to obtain the same number of ampere-turns as before, with a resulting significant cost advantage being obtained.

It is therefore a principal objective of the present invention to provide an improved and more economical construction for small electrical motors of the same general type disclosed in applicant's copending application, Ser. No. 617,529.

It is a particular feature of the present invention that the improved motor embodiments disclosed herein are comprised of a fewer number of parts and, in addition to ease of fabrication and assembly, have other important structural and economic advantages over applicant's as well as other conventional motor designs.

It is a specific feature of the present invention to provide a housing and stator assembly for a four-pole self-starting electrical motor which consists of only two parts of virtually identical design, and a shading flux means for the motor which itself may consist of but a single member and which also serves to hold the parts of the motor together and restrained against relative rotary movement.

It is another specific feature of the present invention to provide, in a small electric motor of the kind described herein, a rotor assembly which is sealed within a nonmagnetic dust cover structure for preventing the entry of magnetic particles and other foreign matter into the rotor assembly.

It is still another specific feature of the present invention to provide, in a small electric motor of the kind described herein, a terminal connection for the stator field coil windings which is located on a radial side of the field coil so as to permit simplification in the connection of external conductor leads and plugs to the field coil winding.

And it is still another specific feature of the present invention to provide, in a small electric motor of the kind described herein, a lubrication reservoir formed by the wire of the stator field coil, thus eliminating the need for providing a separate reservoir element and its associated space in the motor assembly.

The foregoing and other objects, features and advantages of the invention will be more readily understood from a consideration of the following detailed description of preferred embodiments of the invention, as illustrated in the accompanying drawings.

Brief description of the drawings

FIG. 1 is an exploded view in perspective of a motor assembly embodying the improvements of the present invention.

FIG. 1a is a perspective view showing an alternative construction for the tubular member used in the motor assembly of FIG. 1.

FIG. 4 is a perspective view of the motor of FIG. 1, together with certain structure cooperating with the motor.

FIG. 5 is a fragmentary sectional view, similar to FIG. 2, showing an alternative construction for the stator coil and terminal connections for the motor.

Description of the preferred embodiments

Figure 2:
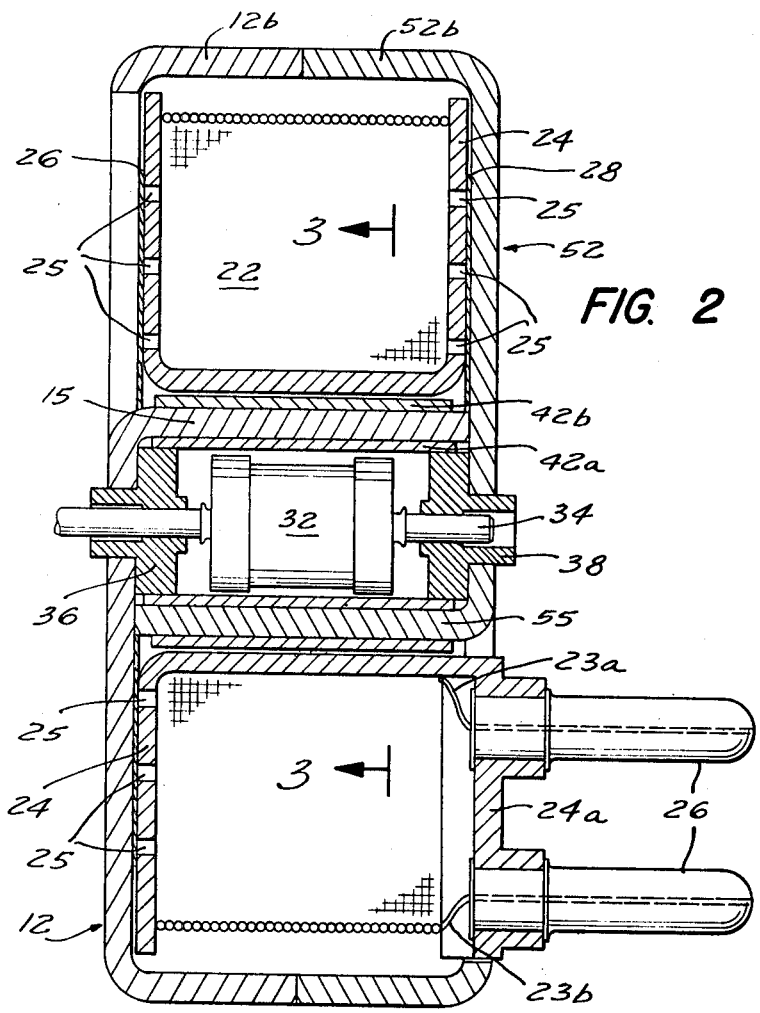
FIG. 2 is a diametric sectional view of the motor parts of FIG. 1 when assembled together.

The exploded view of FIG. 1 shows the parts of the motor assembly 10 comprising principally left cap member 12, field coil 22 and bobbin 24, permanent-magnet rotor 32, the tubular member 42 formed by inner sleeve 42a and crimped tube 42b, and right cap member 52.

The left and right cap members 12 and 52 are made of soft steel or other suitable ferromagnetic material. Each of the caps is formed respectively of a circular disc portion 12a, 52a with a peripheral flange 12b, 52b. In each cap member a pair of poles or legs are lanced out of the central disc portion. Thus, in the left cap member 12 a pair of projecting legs 14, 15 are lanced out and bent at right angles to the disc portion 12a to form two of the four poles of the resultant stator ring assembly. In similar manner the right cap member 52 is provided with a pair of projecting pole legs 54, 55. The left and right cap members 12 and 52 are mirror images of each other and can be formed from the same die. Each of the poles 14, 15, 54, 55 is of generally arcuate cross-section. For certain motor applications, particularly in stepper motors, it is desirable to make the poles which are destined to be shaded (15, 55) somewhat longer and of different radii than the unshaded poles (14, 54). For this reason, as will be brought out in further detail in connection with the discussion of FIGS. 2 and 3, the two pole pairs shown in the exemplary motor assembly of FIG. 1 are not illustrated as being of identical length and radial disposition, but such differences can be accommodated in a common die, in a manner well kown in the art.

The rotor 32 comprises a cylinder of ceramic magnetic material having an axial length greater than its diameter. The rotor is fixed on a shaft 34 rotatably mounted on end bearings 36, 38 and is magnetized permanently with a pair of nonsalient north and south poles which are in cooperating relationship with the stator poles 14, 15, 54, 55. A relatively "hard" material magnetically is used so as to have high coercivity, a high magnetic energy product and a low specific gravity. Representative examples of such materials are Ceramagnet A, A19 and A70 manufactured by Stackpole Carbon Company, Electronic Components Division, St. Marys, Pa., and Index I and Index V manufactured by Indiana General Corporation, Valparaiso, Ind. These materials are of barium ferrite having a composition $BaFe_{12}O_{19}$. Another suitable material is Plastiform available from the Leyman Corporation, Cincinnati, Ohio. The rotor also may be fabricated from a 77% platinum 23% cobalt material made by the Hamilton Watch Company of Lancaster, Pa. This latter material has a residual induction of 6400 gauss, a coercive force 4300 aersteds and a maximum energy product of $9.0 \times 10^6$ gauss-oersteds.

The rotor 32 is provided with an axial hole into which the shaft 34 may be secured as by cementing, moulding, mounting in eyelets or other suitable techniques. In some cases, particularly where Plastiform is used as the rotor material, a series of comparatively thin washers of the material are placed in stacked relationship with each other and are adhesively held together to form the rotor. In other preferred embodiments, the Plastiform material may be extruded in tubular form, cut to length and passed on the shaft.

The use of a long rotor increases the torque available to operate the motor. A relatively high torque is produced when the ratio of rotor length to diameter is within the range of from about 1.25 to 1 to about 2 to 1. This latter feature is particularly advantageous in cases in which the motor is used for intermittent timing operations or for other applications where it is desired to avoid the introduction of a cumulative error in the position of the rotor shaft after repeated starts and stops.

The doughnut-shaped stator field coil 22 is wound around a nylon bobbin 24 as shown for (or, alternatively, the coil may be molded into a self-supporting form as will be later described herein) and, when electrically energized through leads connected to terminal pins 26, the coil produces the stator magnetic flux for the motor.

The tubular member 42 is of low-resistance nonmagnetic metal such as copper or aluminum and is formed of two parts as shown (sleeve 42a, crimped tube 42b) sweat-soldered together, or of a single extruded piece 42' as shown in FIG. 1a.

As shown in the vertical sectional view of FIG. 2, the motor parts when assembled together produce a structure of extremely compact and rugged design. The two cap members 12 and 52 of the assembly fit together so that their peripheral flanges 12b, 52b touch to create a squat cylindrical housing (exemplarily about 1⅓" in diameter), and the respective pole leg pairs 14, 15 and 54, 55 nest together between portions of the tubular member 42 as so to form an annular ring of four stator poles arranged about the center axis of the assembly. As previously mentioned, a diametrical pair (15, 55) of the four-pole stator annulus are preferably somewhat longer than the other pair so that they touch the respective bases of the opposing disc sections 52a, 12a. This arrangement serves to encourage the stator flux to travel along this preferred path through the tubular shading member 42, thus inducing higher currents in the shading member which in turn produce greater shaded flux for motor self-starting. The rotor-shaft assembly 32, 34 is mounted in the central opening of the stator pole annulus and is supported on end bearings 36, 38 fitted into central apertures in the respective cap members 12, 52.

Figure 3:
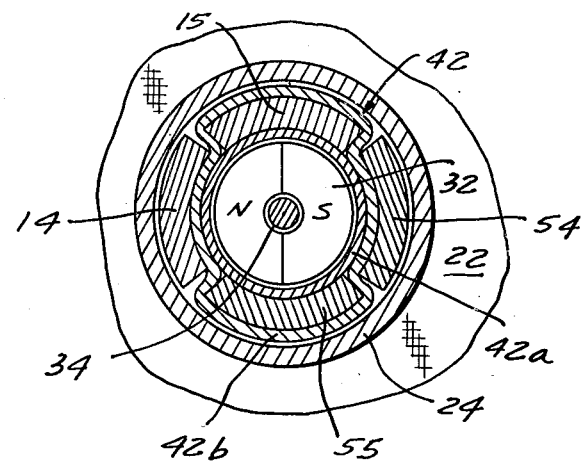
FIG. 3 is a plan sectional view taken along the lines 3—3 in FIG. 2.

As best seen in the diametrical sectional view of FIG. 3, the faces of the four poles forming the stator annulus occupy exemplarily about 75° of arc respectively, and are spaced apart from each other by a 15° angle. The poles 15, 55 which are to be shaded are of slightly smaller radii disposition from the center than the unshaded poles 14, 54 so that the rotor-stator air gap, and thus the magnetic reluctance, is less under the shaded pole pair. This arrangement is particularly beneficial in stepper motor applications since it assures that the rotor will stop in at least one of two known quiescent positions, 180° apart, so that discrete half-revolution steps will be obtained. For certain applications, such as in a self-starting synchronous motor, the radial disposition as well as the length of all the stator poles may be the same, thus permitting both left and right cap members 12 and 52 to be of identical construction—a significant economic advantage at the expense of only a slight sacrifice in motor performance.

Shading of the stator pole flux in order to provide the motor with a self-starting characteristic is effected by the provision of a conductive loop or shading ring around a diametric pair of the stator poles. Thus, still referring to FIG. 3, a shading loop for delaying the build-up of stator flux is provided about pole members 15 and 55 through the tubular member formed by the inner sleeve 42a and the crimped tubular portion 42b.

Tube portion 42b is crimped into four arcuate wall sections alternating between a large radius sector and a small radius sector, and fits in interweaved fashion over, between and under respective poles of the four-pole stator annulus. As shown in the figure, the tube portion 42b passes over the outer faces of a first diametrical stator pole pair 15, 55 and under the inner faces of the second stator pole pair 14, 54, with the change-over from the outer face of one pole to the inner face of its adjacent pole being effected to the radial passageway between the two respective pole members. An inner cylindrical sleeve portion 42a, positioned in the annular air gap between the stator pole annulus and the rotor 32, is dimensioned so that its outer surface abuts against the two small-radius sectors of the crimped tube 42b which are adjacent the inner faces of the pole pair 14, 54. As will be seen from examination of FIG. 3, the tubular member 42 formed by the crimped tube portion 42b and the inner sleeve 42a provides a conductive ring of metal around a diametrical pair of poles 15, 55 so as to create shading flux action as to these poles in the well-known manner. The members 42a, 42b advantageously may be soldered together to improve the electrical path, or better still, may be extruded as one piece of metal as shown in FIGURE 1a. The remaining poles 14, 54 are not encircled by a closed conductive loop of low-resistance metal, and accordingly, in these poles, there is no shading of the stator flux. Thus, with a portion of the flux shaded and a portion unshaded, a unidirectional self-starting characteristic will be produced when the motor is energized, regardless of the quiescent stopping position of the rotor.

By virtue of the interweaving fashion in which the tubular member 42 passes across and between the ring of stator poles, the two cap members 12 and 52 are mechanically locked so as to be restrained against rotary movement relative to each other. With this arrangement, the circumferential spacings between individual stator poles are rigidly maintained. Additionally, it will be noted from FIG. 2 that the inner sleeve portion 42a and the end bearings 36, 38 of the motor housing fit tightly together so as to form an airtight cylindrical dust cover over the rotor assembly 32. This cover keeps the rotor surface free of magnetic particles and other foreign matter.

Returning now to the description of the stator coil construction 22, it will be seen, particularly from an examination of FIG. 2, that the stator coil winding is connected to the radially spaced hollow terminal pins 26. The pins 26 extend in directions parallel to the axis of the motor and are mounted on a base portion 24a formed in the side of the stator coil bobbin 24. The pins project outside of the motor housing through an aligned one of the channel slots (e.g., the slot 55a shown in FIG. 1) formed in the body portion of a cap member (e.g., the member 52) when the associated pole is lanced out. The radial spacing of the pins enables the lead ends 23a, 23b of the coil wire to be connected directly thereto. As a result, there no longer is any need for the conventional time and labor consuming step of taping the coil structure in order to anchor and insulate the coil leads when both are brought out to the periphery of the bobbin, as in commonly done in prior art motors.

As shown in FIG. 4, the terminal pins 26 might typically interconnect with a detachable shaver-type plug 120 for connection to an external source of electrical potential. Alternatively, instead of hollow terminal pins, the lead ends 23a, 23b of the stator coil might be connected to solid wire-wrap type terminals, such as those commonly used in the telephone industry, for example.

FIG. 5 illustrates a modified construction for the stator coil and terminal connections. Instead of winding the stator coil wire around a permanent bobbin or spool, an arbor is used to wind the coil. After removal from the arbor, the coil is treated with an insulating molding compound, such as epoxy resin material, to form a self-supporting coil 22'. The lead ends 23a', 23b' of the coil 22', as exemplary of still another type of suitable terminal connection, are spliced to the respective ends of a two-wire lamp cord type conductor 29. The conductor 29 is passed through the motor housing via an optionally-provided flanged aperture 17, rather than through one of the channel slots already formed by the stator poles.

Self-lubrication of the motor end bearings 36, 38 may be effected, as shown in FIG. 2, by the use of tightly-wound stator coil wire 22 as a lubrication reservoir and the provision of suitable capillary channels for feeding the lubricating oil to the bearings. To this end the coil is impregnated with lubricating oil, and the sides of the coil bobbin 24 are molded with a plurality of small seepage holes 25. Two thin wafers 26, 28 of felt, paper or other oil-absorbent material are inserted at either end of the interior motor housing and are provided with appropriate slot cut-outs to fit over the stator poles, lead wires, etc. The wafers 26, 28 form small conduits which operate by the capillary attraction to bring lubrication fluid from the oil-impregnated coil to the respective bearings 36, 38.

Typically, as shown in FIG. 4, the motor 10 is assembled with an adjunct gear box housing 121 to provide a low output shaft speed for timing and similar applications. In assembling the parts of the motor, an adhesive metallic tape 125 advantageously is employed to secure the cap members 12 and 52 together to form the motor housing. Of course, if the stator poles are shaped to fit with sufficient tightness within the tubular member 42, the tape may not be needed other than for labeling purposes. The stator coil terminal pins 26 are brought out and connected via the plug 120 to a suitable source of electric potential. In some embodiments of the motor, the stator coil is provided with an additional center-tapped lead and terminal connection, and the device is operated as a three-wire stepper motor.

The terms and expressions which have been employed are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. An electric rotating machine comprising a permanent magnet rotor, and a stator structure of generally cylindrical configuration in spaced coaxial relationship with said rotor to form a radial gap therebetween, said stator structure including a field coil and only three additional parts consisting of a pair of pole pieces having salient poles and a shading member in said gap for shading selected ones of said poles, and said pole pieces being of magnetic material and forming a housing for said field coil.

2. An electric rotating machine as set forth in claim 1 in which each of said pole pieces is of integral, one piece construction.

3. An electric rotating machine comprising a cylindrical permanent magnet rotor having at least one pair of nonsalient rotor poles, and a stator structure of generally cylindrical configuration in spaced coaxial relationship with said rotor, said stator structure including a field coil, a pair of pole pieces disposed adjacent opposite ends of said rotor and having salient poles cooperating with nonsalient rotor poles, and a shading member for shading selected ones of said salient poles and for holding the pole pieces together and preventing relative rotary movement between their respective poles.

4. An electric rotating machine comprising a permanent magnet rotor having at least one pair of nonsalient rotor poles, and a cylindrical stator structure in coaxial relationship with said rotor, said stator structure including a field coil, a plurality of pole pieces each having a housing portion and a pair of salient poles protruding from said housing portion, and including a generally tubular shading member disposed about said rotor for shading selected ones of said salient poles.

5. An electric rotating machine comprising a permanent magnet rotor having at least one pair of nonsalient rotor poles, and a stator structure of generally cylindrical configuration disposed about said rotor, said stator structure including a field coil, a plurality of pole pieces each having a housing portion and a pair of salient poles lanced from said housing portion, and including a shading member for shading one of the salient poles on each pole piece, the shading member interconnecting said pole pieces and surrounding said rotor to form a dust cover therefor.

6. An electric rotating machine as set forth in claim 5, in which the motor includes not more than four salient stator poles.

7. An electric rotating machine comprising a cylindrical permanent magnet rotor, and a stator structure of generally cylindrical configuration in coaxial relationship with said rotor, said stator structure including a field coil and only three additional parts consisting of a pair of pole pieces having salient poles and a shading member for shading selected ones of said poles, said pole pieces having housing portions disposed adjacent opposite ends of said rotor, said shading member extending between said housing portions to prevent relative rotary movement between said pole pieces and being interposed between said rotor and said shaded stator poles.

8. An electric rotating machine comprising a cylindrical permanent magnet rotor, and a stator structure of generally cylindrical configuration in coaxial relationship with said rotor, said stator structure including a field coil, a pair of pole pieces having salient poles and a shading member for shading selected ones of said poles, said pole pieces being of magnetic material and having housing portions disposed adjacent opposite ends of said rotor, said shading member extending between said housing portions axially along at least a portion of the length of said rotor and being interweaved with said salient poles to prevent relative rotary movement between said pole pieces.

9. An electric rotating machine comprising a permanent magnet rotor having at least one pair of nonsalient rotor poles, and a stator structure of generally cylindrical configuration disposed about said rotor, said stator structure including a field coil, a plurality of ferromagnetic pole pieces each having a flanged disc portion and a pair of salient poles projecting from said disc portion, and including a shading member for shading one of the salient poles on each pole piece, the shading member being interweaved with said salient poles and surrounding said rotor to form a dust cover therefor.

10. An electric rotating machine as set forth in claim 9 in which at least one of said salient poles is lanced from the disc portion of the pole piece therefor to form a radial slot, said field coil including a plurality of conductor leads extending through said slot.

11. An electric rotating machine comprising a cylindrical permanent magnet rotor having an axial length greater than its diameter and including at least one pair of nonsalient rotor poles, and a cylindrical stator structure in coaxial relationship with said rotor, said stator structure including a field coil, a plurality of ferromagnetic pole pieces each having a disc portion and a pair of salient poles projecting from said disc portion, the disc portions being disposed adjacent opposite ends of said rotor and the salient poles extending in an arcuate array around said rotor in spaced relationship therewith to define a cylindrical air gap between the rotor and the stator structure, and said stator structure including a shading member for shading one of the salient poles on each pole piece, the shading member interconnecting said pole pieces and including a sleeve portion surrounding said rotor to form a dust cover therefor.

12. A self-starting electric motor comprising a cylindrical permanent magnet rotor having an axial length greater than its diameter and including at least one pair of nonsalient rotor poles, and a cylindrical stator structure disposed about said rotor, said stator structure including a field coil, a plurality of ferromagnetic pole pieces each having a flanged disc portion and a pair of salient poles projecting from said disc portion, said salient poles extending in an arcuate array around said rotor in spaced relationship therewith to define a cylindrical air gap between the rotor and the stator structure, and said stator structure including a generally tubular member having a sleeve portion located in said air gap and a shading portion interweaved with said salient poles for shading one of the salient poles on each pole piece, said sleeve portion surrounding said rotor to form a dust cover therefor.

13. A self-starting electric motor as set forth in claim 12, in which the motor includes not more than two shaded salient stator poles and not more than two unshaded salient stator poles, there being only a single pair of nonsalient poles on said rotor.

14. A self-starting electric motor as set forth in claim 12, in which said tubular member includes a pair of bearings at opposite ends of said sleeve portion.

15. A self-starting electric motor as set forth in claim 14, in which said field coil includes means for supplying lubricating oil to said bearings.

16. An electrical rotating machine comprising a permanent magnet rotor and a stator structure of generally cylindrical configuration disposed about said rotor, said structure including a field coil, a pair of pole pieces each having a pair of salient poles, and a shading member which interconnects said pole pieces with each other and shades one of the salient poles on each pole piece.

17. An electrical rotating machine comprising a permanent magnet rotor and a stator structure of generally cylindrical configuration in spaced coaxial relationship with said rotor and forming a radial air gap therebetween said stator structure including a field coil, a pair of pole pieces each having a pair of salient poles, and a shading member in said air gap which shades one of said poles in each pole piece.

References Cited

UNITED STATES PATENTS

| | | | |
|---|---|---|---|
| 2,450,955 | 10/1948 | Hansen et al. | 310—164 |
| 2,665,389 | 1/1954 | Landgraf et al. | 310—164 |
| 2,951,957 | 9/1960 | Eigeman | 310—164 |
| 2,951,855 | 4/1961 | Van Lieshout et al. | 310—163 |
| 3,014,141 | 12/1961 | Riggs | 310—156 |
| 3,131,323 | 4/1964 | Roters et al. | 310—164 |

WARREN E. RAY, Primary Examiner

U.S. Cl. X.R.

310—71, 86, 90, 164, 190, 257

PO-1050
(5/69)

UNITED STATES PATENT OFFICE
CERTIFICATE OF CORRECTION

Patent No. 3,495,111      Dated February 10, 1970

Inventor(s) Arthur W. Haydon

It is certified that error appears in the above-identified patent and that said Letters Patent are hereby corrected as shown below:

Col. 1, line 26, "diped" should be --dipped--.

Col. 4, line 48, "aersteds" should be --oersteds--.

Col. 4, line 71, "for" should be deleted.

Col. 5, line 13, "as so" should be --so as--.

Col. 5, line 64, "to" should be --in--.

Col. 6, line 41, "in" should be --is--.

Col. 10, line 9, "2,951,855" should be --2,981,855--.

SIGNED AND SEALED
NOV 3 1970

(SEAL)
Attest:

Edward M. Fletcher, Jr.
Attesting Officer

WILLIAM E. SCHUYLER, JR.
Commissioner of Patents